United States Patent [19]
Boenigk et al.

[11] Patent Number: 5,481,162
[45] Date of Patent: Jan. 2, 1996

[54] METHOD OF SUPPLYING CURRENT TO A SODIUM HIGH-PRESSURE DISCHARGE LAMP, AND CURRENT SUPPLY SYSTEM

[75] Inventors: Michael Boenigk; Klaus Guenther, both of Berlin; Hans-Georg Kloss, Hohen Neuendorf; Teja Lehmann, Berlin, all of Germany

[73] Assignee: Patent-Treuhand-Gesellschaft F. Elektrische Gluehlampen mbh, Munich, Germany

[21] Appl. No.: 182,596

[22] Filed: Jan. 18, 1994

[30] Foreign Application Priority Data

Jan. 19, 1993 [DE] Germany .......................... 43 01 276.0

[51] Int. Cl.$^6$ ................................. H05B 41/36
[52] U.S. Cl. .................. 315/307; 315/224; 315/287; 315/209 R
[58] Field of Search ................... 315/291, 307, 315/224, 287, 209 R, DIG. 4, DIG. 7, 225, 208, 244, 289, DIG. 2

[56] References Cited

U.S. PATENT DOCUMENTS

| | | | |
|---|---|---|---|
| 4,560,908 | 12/1985 | Stupp | 315/219 |
| 5,103,141 | 4/1992 | Keijser et al. | 315/307 |
| 5,182,503 | 1/1993 | Denneman et al. | 315/224 |
| 5,198,728 | 3/1993 | Bernitz et al. | 315/307 |

FOREIGN PATENT DOCUMENTS

| | | |
|---|---|---|
| 0445882A3 | 9/1991 | European Pat. Off. . |
| 0504967A1 | 9/1992 | European Pat. Off. . |
| 270405 | 7/1989 | Germany . |
| WO90/12478 | 10/1990 | WIPO . |

OTHER PUBLICATIONS

Journal of the Illuminating Engineering Society, vol. 21, No. 1, Dec. 1992, New York, pp. 60–68, article by Rutan et al, "Practical Application of Pulsed High Pressure Sodium Lamp Technology".

*Primary Examiner*—Ali Neyzari
*Attorney, Agent, or Firm*—Frishauf, Holtz, Goodman, Langer & Chick

[57] ABSTRACT

To provide for optimum control of a sodium high-pressure discharge lamp operating under saturated operating conditions, such that the lamp will be operating stably and providing light output which is an optimum with respect to the color rendition index (Ra), light output or luminous flux, and color temperature, without regard to manufacturing tolerances or variations in power supply voltage, the energy supplied to the lamp is controlled with respect to a quotient formed of lamp voltage and lamp current ($V_L/I_L$), said quotient being determined with respect to optimum light values. The power supply for the lamp (3) either is a stabilized output voltage power supply (22) in which the output current is controlled, or an oscillator (32) providing bursts or power pulses (10, 10') formed of oscillations (11). Both the number of power pulses as well as holding pulses (12) between power pulses (to prevent extinction of the lamp), energy level of the respective pulses and frequency of oscillations, respectively, can be controlled to obtain the optimum value for the quotient of lamp voltage and lamp current.

14 Claims, 3 Drawing Sheets

METHOD OF SUPPLYING CURRENT TO A SODIUM HIGH-PRESSURE DISCHARGE LAMP, AND CURRENT SUPPLY SYSTEM

Reference to related application, assigned to the assignee of the present invention, the disclosure of which is hereby incorporated by reference:

U.S. Ser. No. 08/187,597, filed, BOENIGK et al.

Reference to related patent, the disclosure of which is hereby incorporated by reference:

U.S. Pat. No. 5,103,141, Keijser et al.

Reference to related disclosure:

(former) East German Patent 270,405.

FIELD OF THE INVENTION

The present invention relates to a method to supply current to a high-pressure discharge lamp, and more particularly to a sodium high-pressure discharge lamp operated under saturated vapor condition, and to a current supply apparatus and system for such a discharge lamp.

BACKGROUND.

Light sources should have, besides high light output, good color rendition characteristics and selectable color temperature. An additional desirable characteristic is high stability during the normal lifetime of the lamp and during operation, insensitivity of the lamp with respect to tolerances during manufacture, and variations of operating conditions, for example variations in supply voltage.

It is known that electrical high-pressure discharge lamps are highly sensitive to changes in the above additional characteristics and, coupled therewith, to changes in electrical operating parameters. The sensitivity depends, to some extent, on the selected discharge medium, and the structural peculiarities of the particular lamp. This sensitivity to variations and to manufacturing tolerances interferes with many applications for such lamps; under particularly difficult conditions, or upon concurrence of a number of parameters of the lamp, or of its operation, failure of the lamp may result. One of the reasons for such variations are deviations which may arise during manufacture in the fill and of the geometry of the discharge arc. Another, and particularly important reason for the deviation are changes in the composition of the gas and/or the pressure within the discharge vessel in the course of operation of the lamp, during its rated lifetime. These changes may be the result of chemical reactions of the various fill components among each other as well as with the materials of the discharge vessel. Loss of material and change in the gas composition may also be based on diffusion processes through the walls of the discharge vessel.

Variations in operating characteristics may also cause changes in temperature profiles and temperature distribution within the discharge vessel. The changes in the temperature may be the result of variation in lamp power or supplied energy due to variations in the voltage of the supply network. They also may be due to changed absorption characteristics and radiation characteristics of the components of the arc tube due to deposits or chemical changes or, even, due to temperature variations in the ambient surrounding of the lamp, and its fixture. Components of the gases, or the atmosphere within the pressure lamp, which are in vapor pressure balance with a base body or element in the discharge vessel change if the vapor pressure changes. These changes in vapor pressure substantially influence the luminous flux as well as its spectral distribution. They also substantially vary the electrical characteristics of the lamp which, due to then changed energy balance of the lamp within its supply circuit, then influences the temperature distribution in the discharge vessel or arc tube of the lamp even further.

Temperature variations, which change the color rendition index and the light output, and variations in operating voltage may extend to such a level that the lamp may extinguish. This is particularly the case with sodium high-pressure lamps which are operated under saturated vapor condition, and which have a base body including sodium or sodium amalgam. Such changes are particularly annoying if the desired value of the color rendition index and, hence, the sodium vapor pressure, is high, and, as these values increase, the variations affect the operation of the lamp even more. In a standard sodium high-pressure lamp, having a color rendition index Ra of between 20–40, variations in color rendition index are not noticeable. The light output varies only slightly. The arc tube or running voltage rises only to impermissible values after the end of the rated lifetime. Such changes, however, have serious consequences in lamp types with improved color rendition indices, for example with a color rendition index Ra=60.

High-quality interior room illumination with sodium high-pressure discharge lamps requires operation of such lamps with high amalgam vapor pressures. A broadening of the resonance lines due to the partial pressures of the sodium and mercury components results in light having a color rendition index of Ra of about 80, with a color temperature of 2500 K. Different thermal conditions in the arc tube or discharge vessel itself and in its surroundings, as well as changes of the amalgam relationship due to diffusion of sodium and corrosion, lead to undesired changes in the color temperature, and the color locus on a color diagram, as well as to variations of the arc voltage upwardly or downwardly. If the arc voltage drops sharply, the lamp may even extinguish.

U.S. Pat. No. 5,103,141, Keijser et al (claiming priority of Netherland Serial 90 00531, filed Mar. 8, 1990, to which European Patent 445 882 corresponds) discloses control of the combination of running or arc voltage V and current I to a desired or command value $C=V+\beta I$ to stabilize the operation of such sodium high-pressure discharge lamps. This permits operation to maintain a "white" color locus at 2500 K. $\beta$ is a numerical factor which should be small. To compensate for changes in characteristics of the lamp during its rated lifetime, it is necessary, however, to suitably adjust and match the desired or command value C accordingly.

Sodium high-pressure discharge lamps with color temperatures of up to 2500 K can be operated by a conventional or an electronic current supply unit with continuous energy supply. For color temperatures above about 2500 K, a pulsed power supply for the lamp is necessary as described in the (former) East German Patent 270,405. Preferably, the fill of the sodium high-pressure discharge lamp does not contain any mercury but, rather, only sodium and a noble gas. With pulsed power supply, the energy supplied to the lamp is formed by a rapidly recurring sequence of high power short pulses, separated from each other by pauses during which low holding power is supplied, enough to prevent extinction of the discharge in the pauses between the high power pulses. Lamps can be operated with a thermal loading which is comparable to that of a standard lamp, while providing color temperatures of up to 3000 K, with a color rendition index of over 80, and supply relatively high light efficiency at its output. The color temperature is essentially determined by the instantaneous power of the lamp during the pulse phase; the color rendition index is determined primarily by the vapor pressure in the lamp. Investigations have shown, as illustrated in FIG. 1, that the color rendition index Ra can be raised up to Ra=80 by increasing the pressure with only slightly decreasing light output η, essentially indepently of the operating mode of the tamp. Further increase of the vapor pressure increases the color rendition index up to a maximum value of about 90 and, then, leads to a decrease to Ra=60. Coupled therewith is a substantial decrease in light output η and substantial increase in the arc or running voltage, which might lead to extinction of the lamp. The equally important special color rendition index $R_9$ for the red chromatic component, which is so important for interior illumination, rises with the vapor pressure to values of almost 100. In a region above Ra=85 it, however, drops rapidly and steeply to negative values.

THE INVENTION.

It is an object to provide a method which permits stabilized operation of all types of sodium high-pressure discharge lamps, which are intended to operate under saturated conditions, and in which lamp data with respect to arc or running voltage, light output, color rendition and color temperature should be capable of being optimized, which method should be simple and equally applicable to all types of lamps; and to an apparatus which supplies electrical energy to lamps permitting such stabilized operation.

Briefly, a predetermined value for the quotient of lamp voltage and lamp current is determined, leading to optimum operating conditions; the energy output supplied by the current supply apparatus is then controlled in accordance with that quotient of lamp voltage and lamp current ($V_L/I_L$) to have this predetermined value.

Preferably, the power supply provides a sequence of high power pulses, separated by a holding pulse. The power supply apparatus is so controlled that the quotient of lamp voltage and lamp current, during both the power pulses and the holding pulses, will have that predetermined value. As control parameter, either lamp voltage or lamp current can be selected, if the current supply unit is stabilized and has a predetermined output impedance. Likewise, one of the values of pulse voltage, pulse current, holding pulse voltage or holding pulse current can be selected.

The apparatus, to provide for level power supply to the lamp, can include a current limiting unit or, respectively, an electronically controlled oscillator, and a control unit therefor.

It has been found, surprisingly, that control of the technological operating data of the lamp, such as arc or running voltage, light output, color temperature and color rendition index to optimum value can be obtained by appropriately controlling the vapor pressure within the lamp. The measurable control parameter for the vapor pressure can be selected to be the impedance of the plasma arising in the lamp during its operation. For stabilized operation of the lamp, it is then only necessary to so control the output energy from the current supply unit that the impedance of the lamp, in operation, will have the desired value, resulting in the desired light output data.

The impedance of the lamp, in operation, of course is a function of lamp voltage and lamp current, and can be derived from the quotient of lamp voltage and lamp current. In pulse operation, the instantaneous value of the high-power pulse, as well as of the holding pulse, can be used.

A current supply unit which has a stabilized no-load voltage, that is, a voltage which is not stabilized without regard to supply network variations, and a predetermined output impedance, permits controlling only either operating current or voltage on the lamp to a predetermined command value, in order to control vapor pressure to its optimum value. Control of the vapor pressure to the optimum value in turn controls the color rendition characteristics, the light output and the arc or running voltage of the lamp. Pulse operation of the lamp by a current supply unit which has a no-load voltage stabilized against variations in network supply and of predetermined output impedance, permits control by one of the parameters: power pulse voltage, power pulse current, holding pulse voltage or holding pulse current. The lamp energy can be held stable by feedback, selectively, by changing the width of the power pulse, the repetition frequency of the pulses and/or of the holding pulses.

It is not absolutely necessary to maintain the operating voltage of the lamp constant, and a stabilized current supply unit which has a stabilized no-load voltage is then not needed, if the lamp is operated under pulsed condition. The pulse energy is supplied by bursts of high-frequency oscillations. The oscillations form sub-pulses, the frequency of which is controllable. These oscillations are started at the beginning of the power pulse and are terminated when the power pulse ends, thus forming the power pulse itself. Selectively, the holding pulse can also be formed by these oscillations or second high-frequency oscillations, however of substantially smaller energy, smaller by several orders of magnitude. In such operation, the time-course of the electrical energy can be considered as the envelope of the high-frequency oscillations. The output energy supplied to the lamp by the current supply unit can then be easily controlled both in the phase of the holding pulse as well as of the power pulse by changing the frequency of the sub-pulses or oscillations during the respective pulses. In addition to the already-described control of the average energy by controlling the power pulse repetition frequency, power pulse width and holding power, any variations due to variations in network voltage which cause deviations of the operating voltage from a command value can be compensated by sensing the level of operating voltage and controlling the high-frequency oscillations as a function thereof, so that changes in operating voltage which might influence the oscillations are compensated for.

Control of the vapor pressure, as described, automatically evens out all variations and deviations which are caused, for example, due to manufacturing tolerances upon making the lamp, different thermal conditions in operation of the lamp in fixtures, or slow changes in the lamp due to loss of materials in the burner or arc tube, and resulting blackening. The deviations which are compensated, normally, have effects on the heat balance of the dead spaces behind the electrodes. The average lamp power is so controlled that, in spite of these deviations, the dead space temperature, and hence the temperature in the base portion of the lamp, and the vapor pressure in the lamp will not change. It is clear that, by merely maintaining the lamp power constant, as previously customary with electrically operated discharge lamps, such compensation for variation was not obtainable.

The method, and the apparatus therefor, is eminently suitable for turning off the system under extreme environmental conditions, and ageing of the lamp, including advanced ageing of the lamp, by providing a limit range for lamp power whereby the upper limit, for example, can be derived from the thermal loading of the arc tube, and the lower limit which, when operated under pulse condition, may for example be when the flicker frequency becomes perceivable by the human eye. Thus, operation of advanced over-age lamps with undesirable light output characteristics can be easily eliminated.

DRAWINGS

Figure 3:
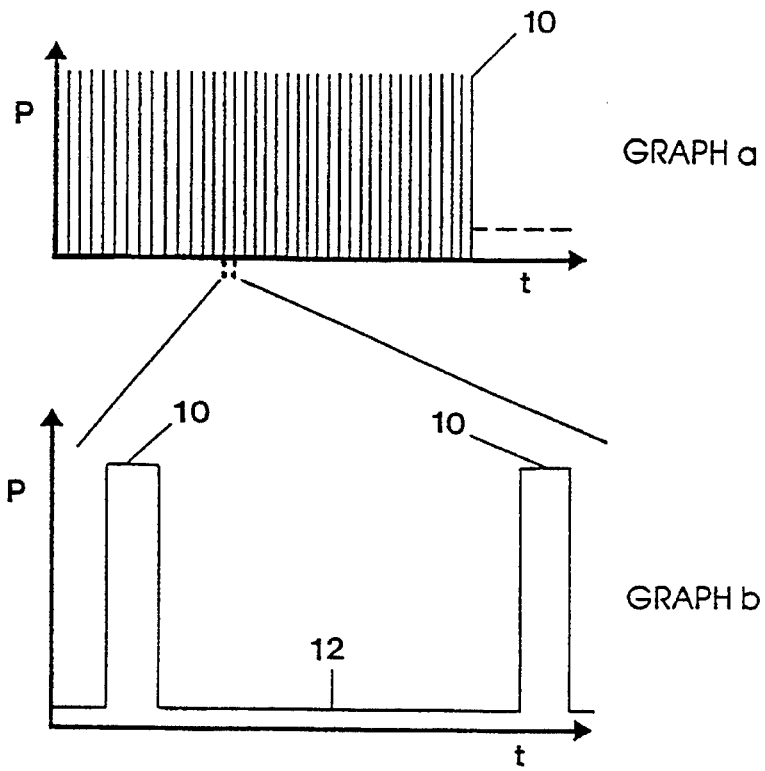
Figure 4:
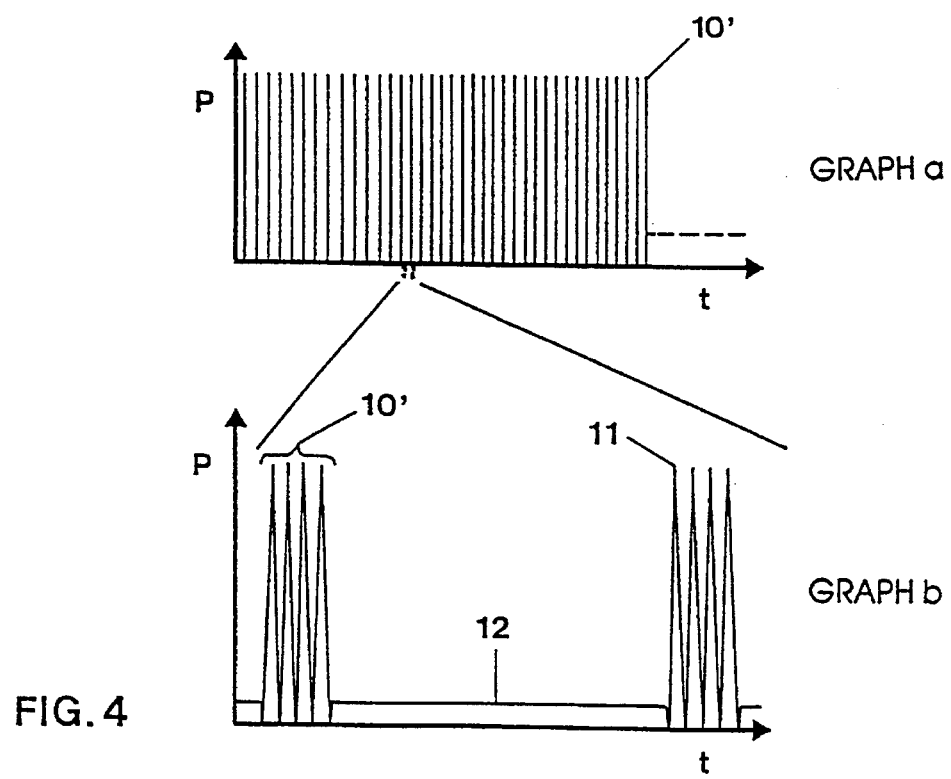

FIG. 3, in two graphs, schematically illustrates in time-compressed (graph a) and time-expanded (graph b) form the power of power pulses and holding pulses as a function of time; and FIG. 4, in two graphs, schematically illustrates in time-compressed (graph a) and time-expanded (graph b) form the power P supplied of power pulses having a plurality of high-frequency oscillations, with respect to time.

DETAILED DESCRIPTION

Figure 1:
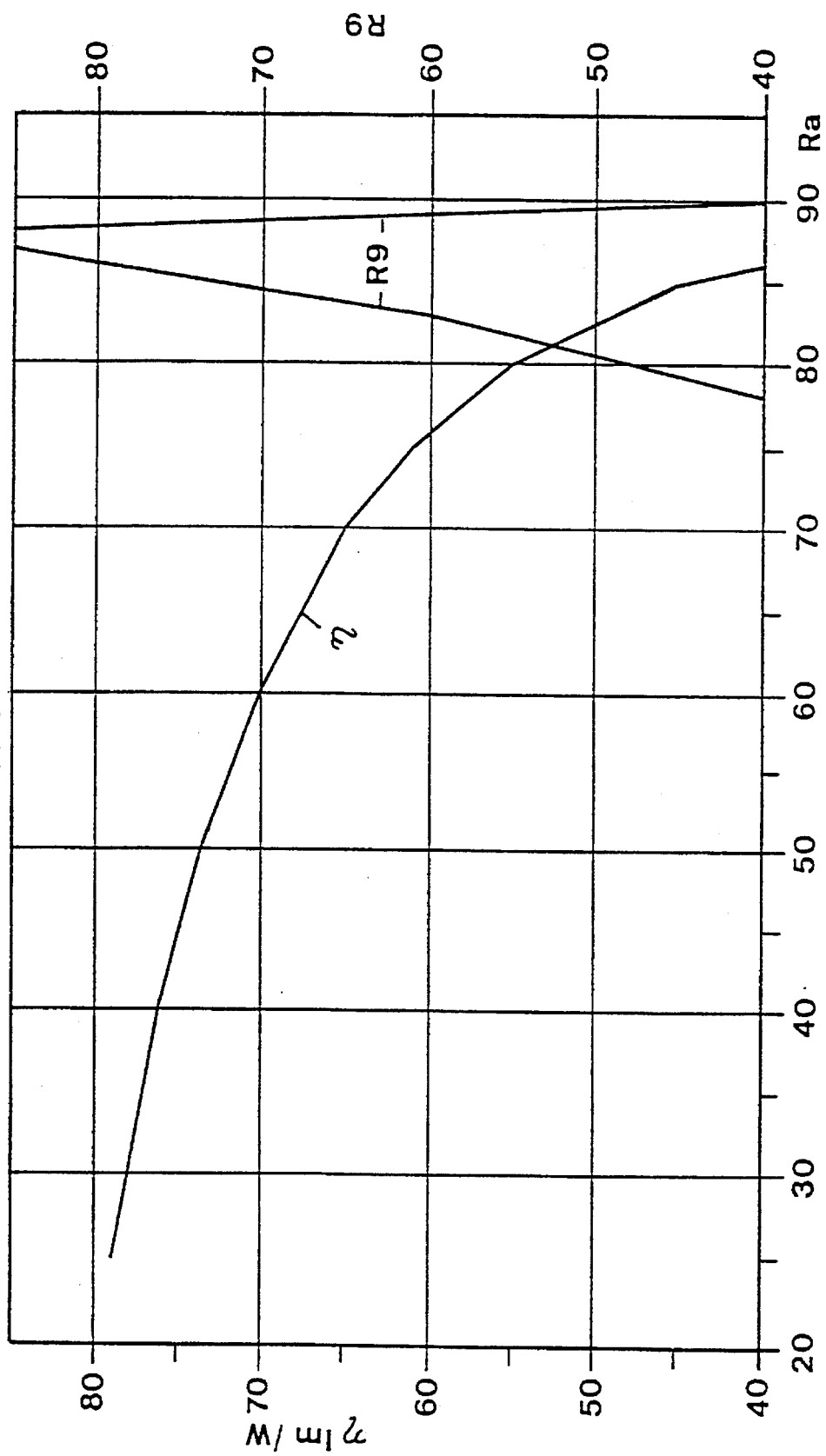
FIG. 1 is a graph of color rendition Ra (abscissa) with respect to light output η in lumens per watt (left ordinate) and red color index $R_9$ (right ordinate)
Figure 2A:
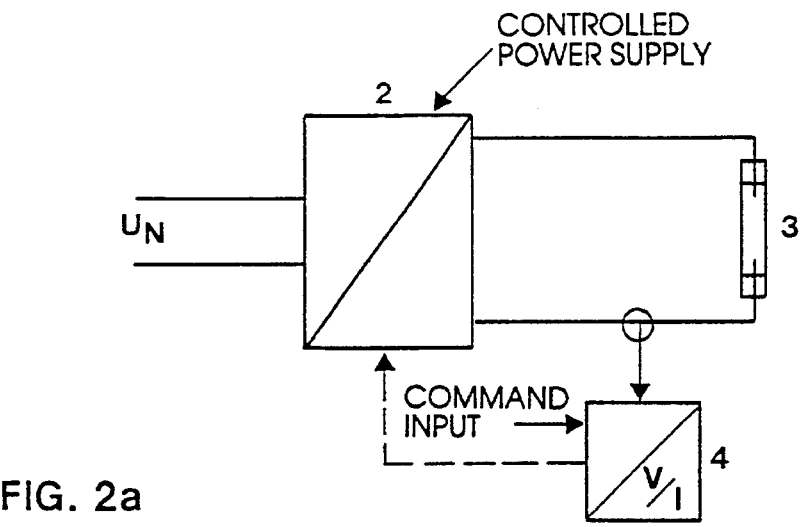
FIG. 2a is a highly schematic circuit diagram of a conventional or electronic current supply unit for a sodium high-pressure discharge lamp for supply of power as a function of a fixed command value.

Referring first to FIG. 2a, which is an example of a conventional electronic current supply unit to operate a sodium high-pressure discharge lamp 3, with uniform power input. The lamp voltage U and the lamp current I are compared in a control unit 4 with command values corresponding to optimum vapor pressure. Upon deviation, the control unit 4 controls a current control unit 2, which may, for example, be an electronically controlled oscillator, to suitably change the output power. In accordance with the invention, the power to the lamp is so controlled that the quotient of lamp voltage to lamp current, representative of vapor pressure, has a predetermined optimum command value.

Energy for the lamp, transmitted via respective control system elements, is derived from a network source $U_N$.

Figure 2B:
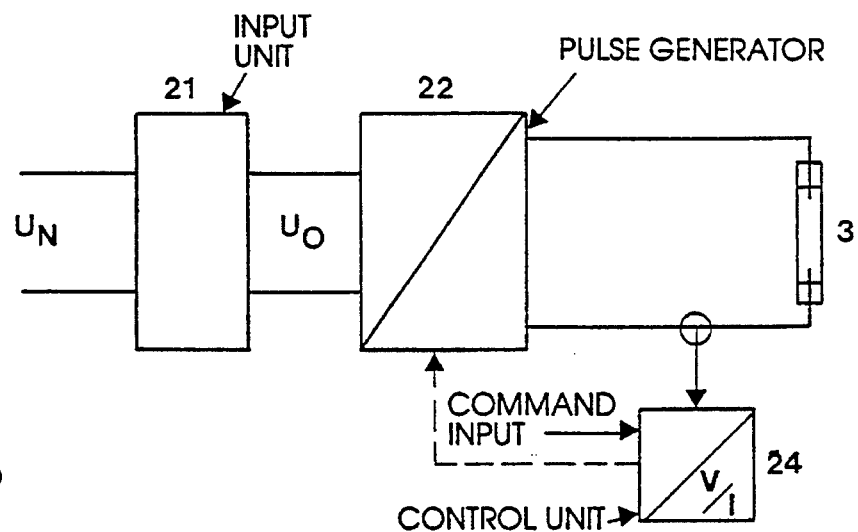
FIG. 2b is a schematic diagram of one embodiment of the invention illustrating an electronic current supply unit with network voltage stabilization, in which the sodium high-pressure discharge lamp is operated with power pulses.

In accordance with an embodiment of the present invention, shown schematically in FIG. 2b, the energy supply unit for pulsed operation of the sodium high-pressure lamp 3 is formed of an input unit 21. The input unit 21 has a harmonic filter, radio interference suppression circuitry, a rectifier and stabilization circuitry of the output voltage $U_o$ for a pulse generator 22. The pulse generator 22 provides a sequence of power pulses 10 (FIG. 3), separated by holding pulses 12, as best seen in FIG. 3, graph b. The lamp 3 will assume an operating state which is determined by ambient conditions and its actual, then pertaining operating characteristics. These operating characteristics will, to some extent, depend on the extent of prior use of the lamp, the fixture in which it is installed, and the like. These then pertaining operating condition will be reflected in a combination of holding pulse voltage, holding pulse current, power pulse voltage and power pulse current. With a given open circuit voltage, and output impedance of the pulse generator 22, each one of the voltages and current values determine, unambiguously, the impedances of the discharge in the lamp 3 during the power pulse phase and the holding pulse phase, respectively, and hence the vapor pressure. These values can be sensed and applied as control values to determine the spacing of the power pulses. The actual selection of the most desirable control value or control parameter will depend primarily on the voltage conditions in the pulse generator 22 and the most economical way of obtaining a sensed or command value for the control unit 24.

The control unit 24 includes the necessary calculating circuitry to determine the quotient of the current and voltage which are sensed during the respective phase.

Figure 2C:
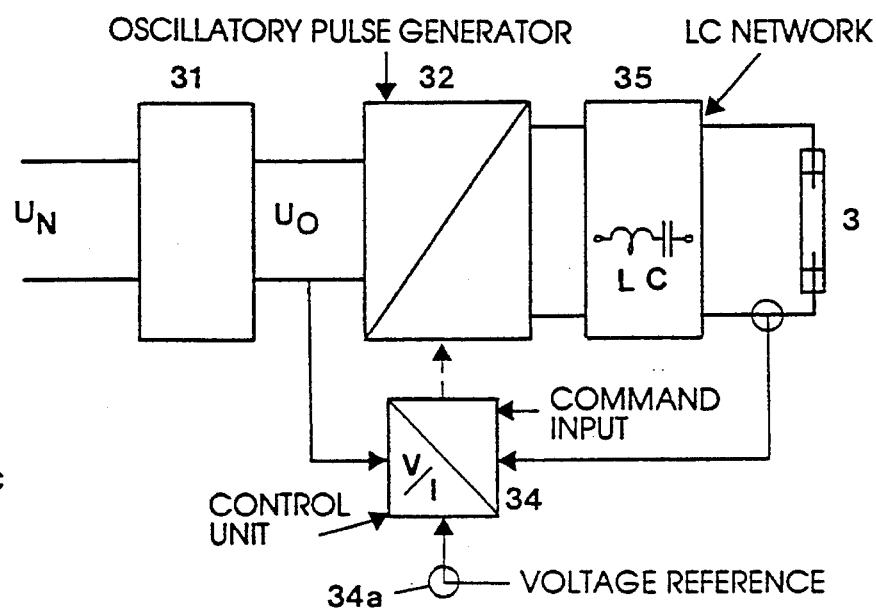
FIG. 2c illustrates an embodiment of an electronic power supply system in which the sodium high-pressure discharge lamp is supplied with power pulses in form of high-frequency oscillations.

Operation of the lamp with pulses 10' which, themselves, are formed or built up of bursts of oscillations 11, without stabilization of the input voltage, is shown in FIG. 2c.

Thus, input unit 31 only include circuitry for harmonic filtering, radio noise suppression and rectification.

The high-frequency oscillations 11 are shown in FIG. 4, graph b. They are derived from the pulse generator 32 and applied to the lamp 3 through a passive LC network 35. The control unit 34 receives information representative of rectified input voltage $U_N$, at the output $U_o$ and, further, receives input information in the form of sensed signals representative of lamp voltage and lamp current during the power pulse phase and holding phase, respectively. The control unit 34 then controls the frequency of the oscillations 11 forming the power pulses 10' and of the holding pulses 12, as well as the time duration, that is, the pulse width of the power pulses 10' and of the holding pulses 12, respectively, supplied by the oscillatory pulse generator 32.

Operation, circuit of FIG. 2c:

First, the rectified input voltage Uo is compared with a desired value. The frequency of the generator 32 is so controlled that deviations of the lamp operating point are compensated by the passive LC network 5. One of the electrical parameters, for example, power pulse voltage, power pulse current and/or holding pulse voltage and holding pulse current is sensed and compared with a command value. In case of deviation, the number of oscillations 11 of the power pulse 10' controlling the width of the power pulse 10' or the length of the holding pulse 12, is changed; alternatively, the frequency of the oscillatory pulse generator can be changed to change the holding power. This change is carried out such that the average lamp power supplied will reestablish the command or desired value of the vapor pressure, and hence the desired value of the impedances of the discharge of the lamp, considering also the dead space temperature. Thus, arc voltage during the power pulse as well as during the holding pulse phase is reestablished so that the color characteristics of the lamp are maintained. The control unit 34, like the control unit 24, includes calculating circuitry to calculate the quotient lamp voltage $V_L$ and lamp current $I_L$, representative of impedance of the discharge arc itself.

Illustrative example:

The lamp 3 is a sodium high-pressure discharge lamp of nominally 70 W;

pulses 10 (FIG. 3, graph b): repetition frequency between 100 and 600 Hz;

time duration of holding pulses 12: between 100 and 500 μs;

instantaneous power of pulses 10: between 0.36 and 1.35 kW;

power of holding pulses 12: about 20–25 W;

average power supplied to the lamp: 76 W.

For the embodiment of FIG. 2c:

LC network 35: inductance L: 150 μH, capacity C: 470 nF; frequency of individual oscillations 11: between about 24 kHz and 47 kHz.

Various changes and modifications may be made, and any features described herein, in connection with any one of the embodiments, may be used with any of the others, within the

We claim:

1. In the combination of a sodium high-pressure discharge lamp, with a controlled energy supply apparatus coupled to said lamp,
   wherein said controlled energy supply apparatus supplies the sodium high-pressure lamp with electrical operating energy sufficient to cause operation of the lamp under saturated condition,
   a method of stabilized operation of said lamp comprising the steps of
   establishing a predetermined command value for the quotient of lamp voltage and lamp current ($V_L/I_L$) of supplied electrical energy; and
   controlling the energy output of said energy supply apparatus to meet said predetermined command value.

2. The method of claim 1, wherein said energy supply apparatus provides a sequence of high power pulses separated by low power holding pulses,
   and wherein said step of controlling the energy output of said energy supply apparatus comprises
   controlling the quotient of lamp voltage and lamp current, representative of impedance of the sodium high-pressure discharge lamp, in operation, during the high power pulses, and during the holding pulses such that the high power pulses and holding pulses, together, provide pulse energy to the lamp for operation of the lamp when said quotient has said predetermined value.

3. The method of claim 1, wherein said energy supply apparatus has a stabilized no-load output voltage and a predetermined output impedance;
   and wherein at least one of the operating parameters of the lamp comprising lamp voltage and lamp current are so selected that said lamp operates under conditions such that said quotient has said predetermined value.

4. The method of claim 2, wherein said current supply apparatus has stabilized no-load voltage and predetermined output impedance,
   and wherein said step of controlling said energy supply apparatus comprises controlling said energy supply apparatus as a function of at least one of the values: power pulse voltage, power pulse current, holding pulse voltage, holding pulse current, so that said quotient will have said predetermined value.

5. The method of claim 2, wherein said step of controlling the energy supply apparatus comprises controlling the average lamp energy supplied by controlling at least one of: duration of high power pulses (10), pulse gaps or spacing of high power pulses (10), duration of holding pulses (12), power level of holding pulses (12).

6. The method of claim 2, wherein said power pulse (10') is formed of a burst of a plurality of high-frequency oscillations (11);
   and wherein said step of controlling said energy supply apparatus comprises controlling at least one of: the frequency of said high-frequency oscillations (11); the number of high-frequency oscillations (11), to thereby control the energy of said power pulses.

7. The method of claim 6, including the step of sensing the voltage of a power supply network to which said energy supply apparatus is connected, to derive a network voltage value and comparing said network voltage value with a standard network reference value;
   and compensating for variations in network voltage value by controlling at least one of: the frequency of said high-frequency oscillations (11) and the number of said high-frequency oscillations, to compensate for the effect of variations of network voltage on said quotient.

8. The method of claim 1, including the step of establishing upper and lower limit values of, respectively, output voltage and output current derived from said energy supply apparatus;
   and disconnecting the energy supply apparatus when at least one of said parameters: output current, output voltage reaches one of said limit values.

9. The combination of
   a sodium high-pressure discharge lamp
   with
   a current supply system connected to supply operating energy to the sodium high-pressure discharge lamp (3), sufficient for operating said lamp under saturated condition,
   carrying out the method of claim 1,
   said current supply system comprising
   a current supply apparatus or current supply unit (2, 22, 32) furnishing output current under controlled conditions for supplying electrical energy to said lamp (3); and
   a control unit (4, 24, 34) coupled to receive at least one of the parameters: lamp voltage, lamp current, and connected to and controlling said current supply unit (22) in accordance with the quotient of lamp voltage and lamp current ($V_L/I_L$), so that said quotient will have said predetermined command value.

10. The system of claim 9, wherein the current supply unit (22) has a stabilized output voltage.

11. The system of claim 9, wherein said current supply unit comprises a pulse generator (22) providing spaced power pulses (10) separated by holding pulses (12) having a power level which is low with respect to the power pulses.

12. The system of claim 10, wherein said current supply unit comprises a pulse generator (22) providing spaced power pulses (10) separated by holding pulses (12) having a power level which is low with respect to the power pulses.

13. The system of claim 9, wherein the current supply unit comprises
   a high-frequency oscillator (32) supplying a plurality of spaced bursts or high power pulses (10') formed of high-frequency oscillations (11), and holding pulses (12) at a lower power level than said high power pulses (10') in the gaps (12) between said bursts or high power pulses (10');
   a passive LC network (35) is provided connected between said pulse generator (32) and said lamp (3), and
   the control unit (34) controls said pulse generator (32) by, selectively, controlling at least one of: the frequency of said high-frequency oscillations (11), the number of oscillations (11), and hence the width of said bursts or high power pulses (10'), the duration of gaps between said bursts or high power pulses (10'), and the power being supplied to said lamp during said gaps between the bursts or high power pulses.

14. The system of claim 13, wherein said LC network (35) is tuned to at least approximately the frequency of said high-frequency oscillations (11).

* * * * *